(12) United States Patent
Fujiwara et al.

(10) Patent No.: US 9,946,342 B2
(45) Date of Patent: Apr. 17, 2018

(54) PROGRAMMABLE DISPLAY DEVICE, PORTABLE TERMINAL DEVICE, DATA PROCESSING METHOD, AND PROGRAM

(71) Applicant: OMRON Corporation, Kyoto-shi, Kyoto (JP)

(72) Inventors: Kiyotaka Fujiwara, Kyoto (JP); Takayoshi Yamashita, Kasugai (JP); Fumio Kawakami, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/113,880

(22) PCT Filed: Jan. 30, 2015

(86) PCT No.: PCT/JP2015/052647
§ 371 (c)(1),
(2) Date: Jul. 25, 2016

(87) PCT Pub. No.: WO2015/122294
PCT Pub. Date: Aug. 20, 2015

(65) Prior Publication Data
US 2016/0349840 A1  Dec. 1, 2016

(30) Foreign Application Priority Data

Feb. 13, 2014 (JP) ................................ 2014-025458

(51) Int. Cl.
*G06F 3/00* (2006.01)
*G06F 3/01* (2006.01)
(Continued)

(52) U.S. Cl.
CPC ........... *G06F 3/013* (2013.01); *G05B 19/042* (2013.01); *G05B 19/054* (2013.01); *G06F 3/005* (2013.01);
(Continued)

(58) Field of Classification Search
CPC ...... G06F 3/013; G06F 3/0346; G06F 3/0488; G06F 3/01; G06F 3/005; G06F 3/048;
(Continued)

(56) References Cited

U.S. PATENT DOCUMENTS 7,027,054 B1 *  4/2006  Cheiky ................... G06T 13/40
345/473
2011/0298689 A1 * 12/2011  Böhmer ................ G06F 3/1431
345/1.1
(Continued)

FOREIGN PATENT DOCUMENTS

JP      H11-85442 A    3/1999
JP      2002-149332 A  5/2002
(Continued)

*Primary Examiner* — Muhammad N Edun
(74) *Attorney, Agent, or Firm* — Metrolexis Law Group, PLLC

(57) ABSTRACT

A programmable display device connectable to a programmable logic controller in a communicable manner includes a sightline estimate unit, which estimates a direction of a sightline using image data obtained by capturing an image of a person, a display control unit, which displays a screen including an object on a display, a measurement unit, which measures a time period for which the sightline is directed to the object when the sightline is determined to be directed to the object through the estimation, and a storage unit, which stores image identification information identifying the object and time information indicating the measured time period in association with each other. This allows a third person to determine a time period for which a user has gazed at an object.

19 Claims, 13 Drawing Sheets

(51) Int. Cl.
  *G05B 19/042* (2006.01)
  *G06F 3/048* (2013.01)
  *G06F 3/0346* (2013.01)
  *G05B 19/05* (2006.01)
  *G06K 9/00* (2006.01)
  *G06F 3/0483* (2013.01)
  *G06F 3/0488* (2013.01)

(52) U.S. Cl.
  CPC .............. *G06F 3/01* (2013.01); *G06F 3/0346* (2013.01); *G06F 3/048* (2013.01); *G06K 9/00255* (2013.01); *G06K 9/00281* (2013.01); *G06K 9/00604* (2013.01); *G05B 2219/1105* (2013.01); *G05B 2219/14097* (2013.01); *G06F 3/0483* (2013.01); *G06F 3/0488* (2013.01)

(58) Field of Classification Search
  CPC .............. G06F 3/0483; G06K 9/00604; G06K 9/00255; G06K 9/00281; G05B 19/054; G05B 19/042; G05B 2219/1105; G05B 2219/14097
  See application file for complete search history.

(56) References Cited

U.S. PATENT DOCUMENTS

2012/0144312 A1  6/2012  Mliyamoto
2014/0320702 A1* 10/2014  Tsubusaki .......... H04N 5/23296
                                                348/240.3

FOREIGN PATENT DOCUMENTS

| JP | 2004-326468 A | 11/2004 |
| JP | 2005-031876 A | 2/2005 |
| JP | 2008-112222 A | 5/2008 |
| JP | 2008-165353 A | 7/2008 |
| JP | 2009-227246 A | 10/2009 |
| JP | 2011-059194 A | 3/2011 |
| JP | 2012-123513 A | 6/2012 |

* cited by examiner

Fig. 5

| User ID | Date and time | Operation | Page ID | Object ID | Gaze time | Pause time |
|---|---|---|---|---|---|---|
| A001 | 2014.1.31 10:0:15 | Check quantity | P021 | | | |
| A001 | 2014.1.31 10:21:20 | Arrive | P011 | | | |
| A001 | 2014.1.31 10:21:50 | Gaze | P011 | G02 | 30 sec | |
| A001 | 2014.1.31 10:22:10 | Gaze | P011 | G03 | 20 sec | |
| A001 | 2014.1.31 10:22:20 | Cancel | P011 | | | 60 sec |
| ... | ... | ... | ... | | | |
| ... | ... | ... | ... | | | |

D5

PROGRAMMABLE DISPLAY DEVICE, PORTABLE TERMINAL DEVICE, DATA PROCESSING METHOD, AND PROGRAM

FIELD

The present invention relates to a programmable display device, a portable terminal device, a data processing method used in a programmable display device, and a program for controlling a programmable display device.

BACKGROUND

Display devices known in the art display information and receive input from a user.

Japanese Unexamined Patent Application Publication No. 2012-123513 (Patent Literature 1) describes an information processing device as one such display device, which is connected to a server in a communicable manner. The information processing device determines an object to which the sightline of the user is directed based on coordinate information indicating the position of the sightline of the user in an image displayed on a screen, and object information including area information indicating an image area including an object. When detecting an object to which the sightline of the user is directed, the information processing device selectively performs processing intended for the detected object. The information processing device further generates target object information indicating the detected object, and transmits the generated target object information to the server.

Japanese Unexamined Patent Application Publication No. 2009-227246 (Patent Literature 2) describes an operation input device for vehicles including a camera, as another example of the above display device. This operation input device for vehicles includes a control circuit that detects the sightline of an operator operating an operational panel from an image captured with the camera. When the detected sightline is in a predetermined sightline state for permitting an operation input, the control circuit switches the operational panel from an operation input prohibited mode to an operation input permitted mode.

The display device known in the art may be a programmable display device, which is connected to a programmable logic controller (hereafter also referred to as a PLC) in a communicable manner. Japanese Unexamined Patent Application Publication No. 2008-112222 (Patent Literature 3) describes an operation display device as an example of the above programmable display device. The operation display device stores a facial image of an operator together with the history of operations performed by the operator.

CITATION LIST

Patent Literature

Patent Literature 1: Japanese Unexamined Patent Application Publication No. 2012-123513
Patent Literature 2: Japanese Unexamined Patent Application Publication No. 2009-227246
Patent Literature 3: Japanese Unexamined Patent Application Publication No. 2008-112222
Patent Literature 4: Japanese Unexamined Patent Application Publication No. 2011-59194
Patent Literature 5: Japanese Unexamined Patent Application Publication No. 2008-165353

SUMMARY

Technical Problem

However, with the technique described in Patent Literature 1, the time period for which the user of the display device has continuously gazed at the object cannot be determined later. This is common to Patent Literatures 2 to 5.

In response to this issue, one or more aspects of the present invention are directed to a programmable display device that allows a third person to determine a time period for which a user has gazed at an object, a portable terminal device, a data processing method used in the programmable display device, and a program for controlling the programmable display device.

Solution to Problem

One aspect of the invention provides a programmable display device including an estimate unit, a display control unit, a measurement unit, and a storage unit. The estimate unit estimates a direction of a sightline using image data obtained by capturing an image of a person. The display control unit displays a first screen including a first object on a display. The measurement unit measures a time period for which the sightline is directed to the first object when the sightline is determined to be directed to the first object through the estimation. The storage unit stores first image identification information identifying the first object and first time information indicating the measured time period in association with each other.

In some embodiments, the programmable display device further includes a transmission unit that transmits the first image identification information and the first time information stored in association with each other to a server device.

In some embodiments, the display control unit displays an image associated in advance with the first object on the display when the time period for which the sightline is directed to the first object is not less than a first reference time period.

In some embodiments, the image associated in advance is an image for supporting a user operation.

In some embodiments, when displaying the image for supporting the user operation on the display, the display control unit further displays, on the display, a software button for deleting the displayed image for supporting the user operation. The programmable display device receives an input operation with the software button when satisfying the condition that the time period for which the sightline is directed to the image for supporting the user operation is not less than a second reference time period.

In some embodiments, the first screen further includes a second object. The measurement unit measures a time period for which the sightline is directed to the second object when the sightline is determined to be directed to the second object through the estimation. The storage unit stores second image identification information identifying the second object and second time information indicating the measured time period in association with each other.

In some embodiments, when receiving an input instruction to switch from the first screen to a second screen, the display control unit displays the second screen on the display. The storage unit stores first screen identification information identifying the first screen, the first image identification information, and the first time information in association with one another when the sightline is determined to be directed to the first object through the estimation during displaying of the first screen.

In some embodiments, the first object is a software button.

Another aspect of the invention provides a programmable display device including an estimate unit, a display control unit, a measurement unit, and a storage unit. The estimate unit estimates a direction of a sightline using image data obtained by capturing an image of a person. The display control unit displays a designated screen from a plurality of predetermined screens on a display. The measurement unit measures a time period for which the sightline is directed to the designated screen when the sightline is determined to be directed to the designated screen through the estimation. The storage unit stores screen identification information identifying the designated screen and time information indicating the measured time period in association with each other.

A still another aspect of the invention provides a portable terminal device for obtaining, from a programmable logic controller via a repeater, data that the programmable logic controller has obtained from a control target device. The portable terminal device includes an estimate unit, a display control unit, a measurement unit, and a storage unit. The estimate unit estimates a direction of a sightline using image data obtained by capturing an image of a person. The display control unit displays a screen including an object on a display. The measurement unit measures a time period for which the sightline is directed to the object when the sightline is determined to be directed to the object through the estimation. The storage unit stores identification information identifying the object and time information indicating the measured time period in association with each other.

In some embodiments, the repeater is a programmable display device.

A still another aspect of the invention provides a portable terminal device that is wirelessly connectable to a programmable logic controller in a communicable manner, and displays data obtained from the programmable logic controller. The portable terminal device includes an estimate unit, a display control unit, a measurement unit, and a storage unit. The estimate unit estimates a direction of a sightline using image data obtained by capturing an image of a person. The display control unit displays a screen including an object on a display. The measurement unit measures a time period for which the sightline is directed to the object when the sightline is determined to be directed to the object through the estimation. The storage unit stores identification information identifying the object and time information indicating the measured time period in association with each other.

A still another aspect of the present invention provides a data processing method implementable by a programmable display device. The method includes allowing a processor included in the programmable display device to estimate a direction of a sightline using image data obtained by capturing an image of a person, allowing the processor to display a screen including an object on a display, allowing the processor to measure a time period for which the sightline is directed to the object when the sightline is determined to be directed to the object through the estimation, and allowing the processor to store, in a memory, identification information identifying the object and time information indicating the measured time period in association with each other.

A still another aspect of the present invention provides a program for controlling a programmable display device. The program enables a processor included in the programmable display device to implement estimating a direction of a sightline using image data obtained by capturing an image of a person, displaying a screen including an object on a display, measuring a time period for which the sightline is directed to the object when the sightline is determined to be directed to the object through the estimation, and storing, in a memory, identification information identifying the object and time information indicating the measured time period in association with each other.

Advantageous Effects

One or more embodiments of the present invention allow a third person to determine a time period for which a user has gazed at an object.

BRIEF DESCRIPTION OF THE DRAWINGS

FIGS. 2A to 2C are diagrams each showing the screen of a programmable display device after a person with operation authority has logged in.

FIG. 5 is a table describing log data to be transmitted from the programmable display device to a server device.

DETAILED DESCRIPTION

Figure 1:
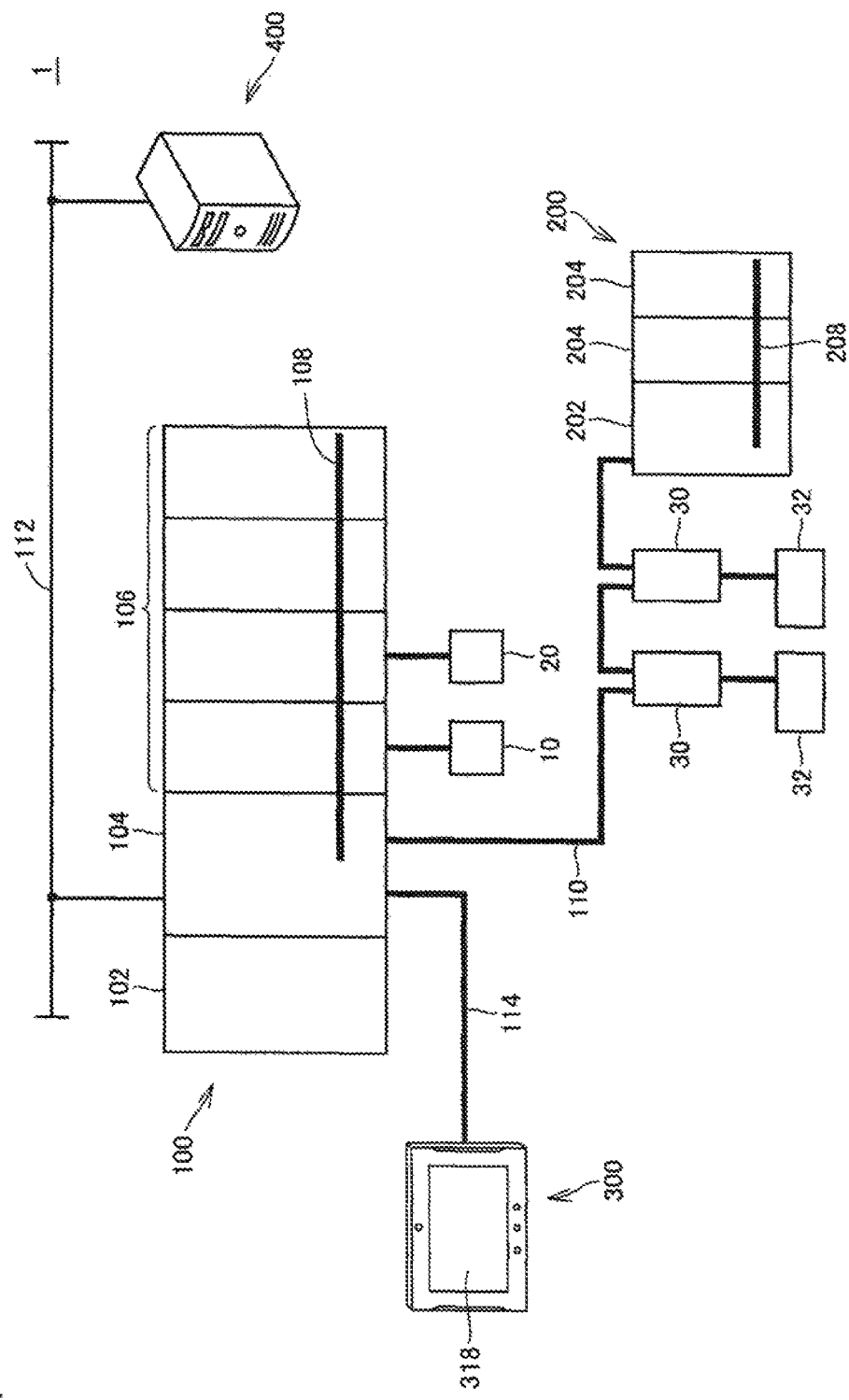
FIG. 1 is a schematic diagram showing the system configuration of a control system according to one embodiment.

A programmable display device according to embodiments of the present invention will now be described in detail with reference to the drawings. The same or corresponding components in the figures are given the same reference numerals, and will not be described redundantly.

A. System Configuration

FIG. 1 is a schematic diagram showing the system configuration of a control system 1 according to one embodiment. Referring to FIG. 1, the control system 1 includes a programmable logic controller (PLC) 100, a programmable display device, which is a human machine interface (HMI) 300 connected to the PLC 100 in a communicable manner, and a server device 400 connected to the PLC 100 in a communicable manner. The server device 400 is included in, for example, an intranet.

The PLC 100 executes a user program (described later) either periodically or as an occasional event. The user program is created by a user of the PLC 100. The user can create a program (source program) including access instructions by operating, for example, a support apparatus (not shown). The support apparatus converts the source program into a format executable by the PLC 100, and transmits the resulting user program to the PLC 100. The support apparatus provides various functions associated with the PLC 100, including settings of parameters, programming, monitoring, and debugging. The PLC 100 and the support apparatus are typically connected to each other in a communicable manner in accordance with the USB (Universal Serial Bus) specifications.

The PLC 100 executes the user program, and communicates with the server device 400 in accordance with an instruction included in the user program. More specifically, the PLC 100 and the server device 400 can transmit and receive data between them with a network 112, such as EtherNet (registered trademark).

The PLC 100 includes a CPU 104, which performs control computations, and at least one input/output (IO) unit 106. These units can transmit and receive data between them with a PLC system bus 108. These units receive an appropriate voltage supplied from a power supply 102.

In the control system 1, the PLC 100 transmits and receives data with various field devices via the IO units 106 (connected to each other with the PLC system bus 108) and/or with a field bus 110. These field devices include an actuator that processes a control target or a sensor that obtains various information from a control target. Examples of these field devices shown in FIG. 1 include a detection switch 10, a relay 20, and servo motor drivers 30 for driving motors 32. The PLC 100 is also connected to a remote 10 terminal 200 with the field bus 110. The remote 10 terminal 200 basically performs typical input and output processes in the same manner as the IO units 106. More specifically, the remote 10 terminal 200 includes a communication coupler 202 for performing processing associated with data transfer with the field bus 110, and at least one IO unit 204. These units can transmit and receive data between them with a remote 10 terminal bus 208.

A programmable display device 300 is connected to the PLC 100 with a connection cable 114 in a communicable manner. The programmable display device 300 displays various information obtained from the PLC 100 on the screen.

Further, the programmable display device 300 has a facial recognition function. More specifically, the user can use the programmable display device 300 only after successful facial recognition with the programmable display device 300. This will be described in detail below.

The programmable display device 300 controls access to an application. The programmable display device 300 stores data representing facial features of the user (feature data). The programmable display device 300 performs facial recognition of the user based on image data obtained by capturing an image of the user and the above feature data. The programmable display device 300 permits the user to access the application when the user is recognized successfully. The server device 400 prestores the feature data, which is obtained by the programmable display device 300 as appropriate. In the control system 1, the programmable display device 300 may transmit image data obtained by capturing an image to the server device 400, and the server device 400 may then perform facial recognition.

The programmable display device 300 also has a help function. The help function will be described in detail later. Hereafter, a login state is a state in which an access to an application is permitted, whereas a logout state is a state in which an access to an application is not permitted. Once the access to the application is permitted, the programmable display device 300 issues a right to access the application. When the access to the application is not permitted anymore, the programmable display device 300 cancels the right to access the application.

B. Processing Overview b1. First Processing

Figure 2A:
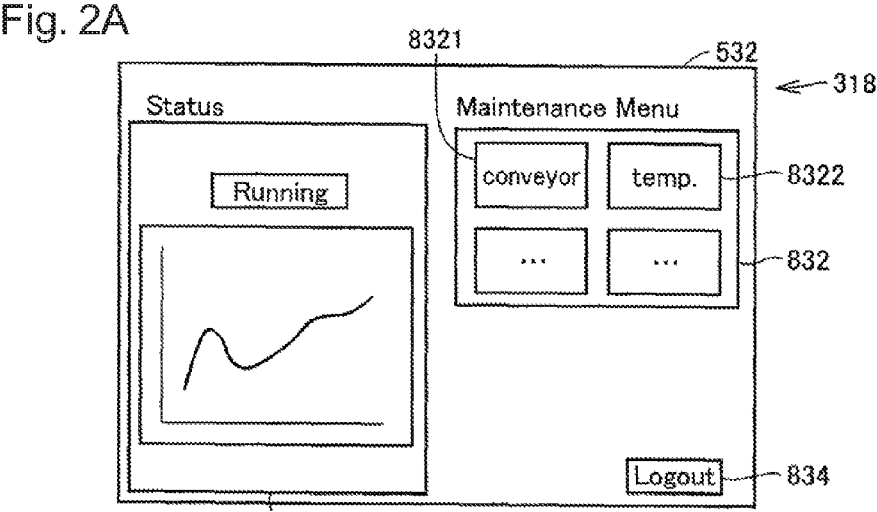
Figure 2B:
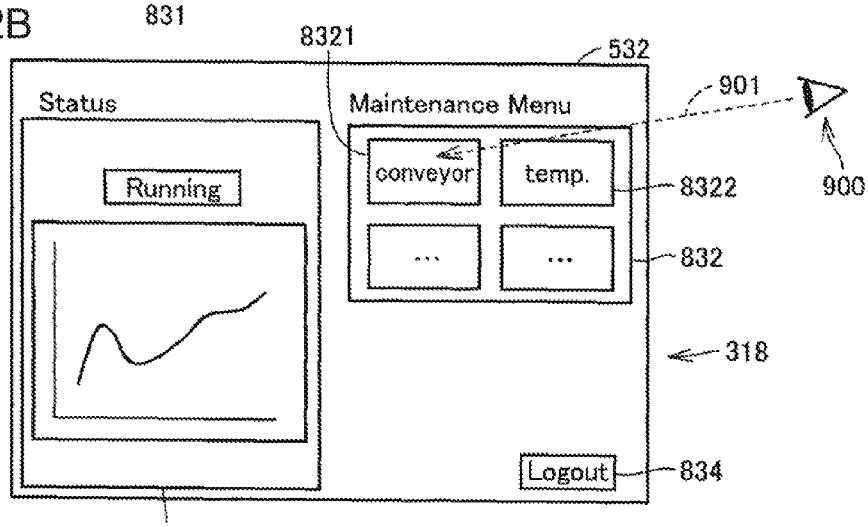
Figure 2C:
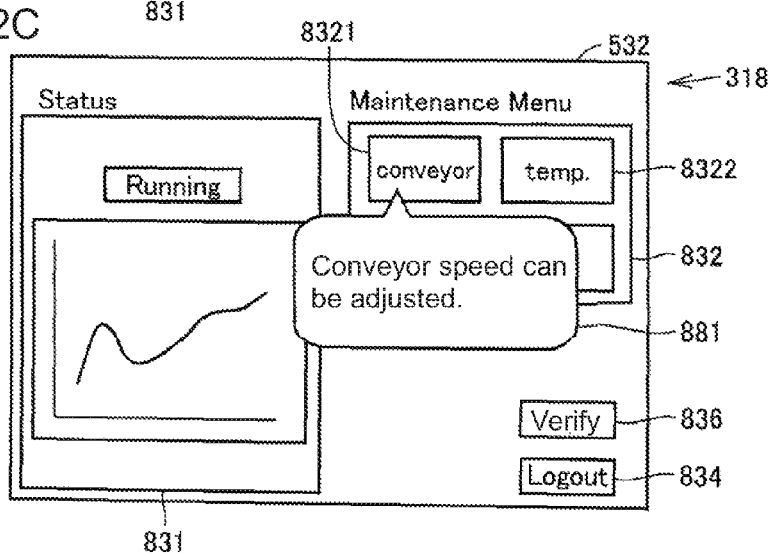

FIGS. 2A to 2C are diagrams each describing first processing performed in the programmable display device 300. More specifically, FIGS. 2A to 2C are diagrams each showing the screen of the programmable display device 300 after a person with operation authority (hereafter also referred to as a user) has logged in (in a login state).

Referring now to FIG. 2A, the programmable display device 300 displays a page screen 532. The programmable display device 300 prestores a plurality of page screens, and switches page screens to be displayed on a touch screen 318 (more specifically, a display included in the touch screen) in accordance with, for example, an instruction from the user. More specifically, the programmable display device 300 displays a page screen including data obtained from the PLC 100. This will be described in detail below.

The programmable display device 300 displays the page screen 532 including a plurality of objects 831, 832, and 834 on the touch screen 318. The object 831 includes data obtained from the PLC 100 in real time. More specifically, a graph in the object 831 is updated as appropriate during displaying of the page screen 532.

The object 832 shows a maintenance menu. The object 832 includes a plurality of objects 8321, 8322, . . . . The object 8321 is used to adjust the speed of the belt conveyor. The object 8322 is used to adjust the temperature. The object 834 is a software button to switch to a logout state.

As shown in FIG. 2B, the user gazes at the object 8321 for a predetermined time T1 (hereafter also referred to as a reference time period T1) (or the user views the object continuously with his or her eyes 900). In other words, the sightline 901 of the user is directed to the object 8321 for the reference time period T1. In this case, the programmable display device 300 implements its help function to display a support image 881 associated in advance with the object 8321 in a manner superimposed on the page screen 532 as shown in FIG. 2C. The support image is an image (help display) including comments to support an operation performed by the user of the programmable display device 300.

More specifically, the programmable display device 300 displays the support image 881 using a speech balloon with a trail pointed toward the object 8321 on the touch screen 318 to allow the user to see the support image 881 associated with the object 8321.

An object 836 is a software button to delete (hide) the displayed support image 881. The user may select the object 836 with a touch to hide the support image 881.

In the above embodiment, the object 8321 is gazed at for the reference time period T1. When, for example, an object other than the object 8321 (e.g., the object 8322) is gazed at for the reference time period T1, the programmable display device 300 displays a support image associated with the other object in a manner superimposed on the page screen 532.

The user may tend to gaze at an object in the page screen for at least the reference time period T1 when the user may be unable to determine an operation to be performed by using the object. The programmable display device 300 displays a support image associated in advance with the object on the touch screen 318 to allow the user to easily determine an operation to be performed by using the object. In other words, the programmable display device 300 can provide an operational support to the user without waiting for an input operation directly performed with the user's finger.

b2. Second Processing

Figure 3A:
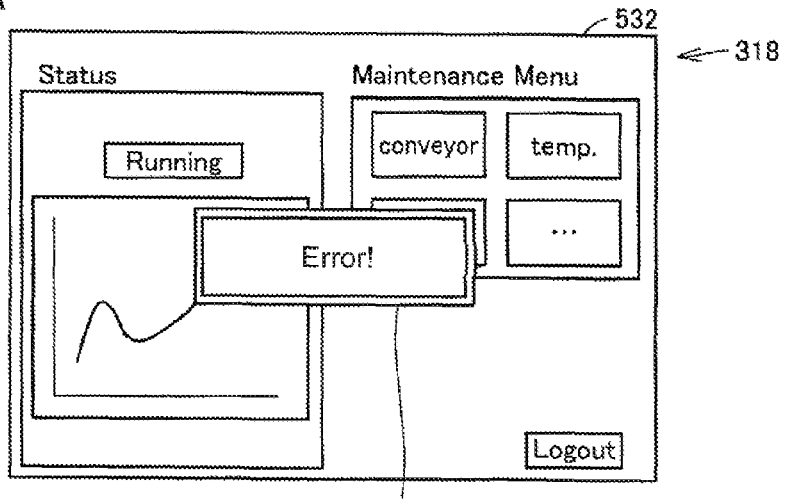
FIGS. 3A to 3C are diagrams each describing the processing performed when an error occurs in a control system 1 in the states shown in FIGS. 2A to 2C (or during displaying of a page screen 532).
Figure 3B:
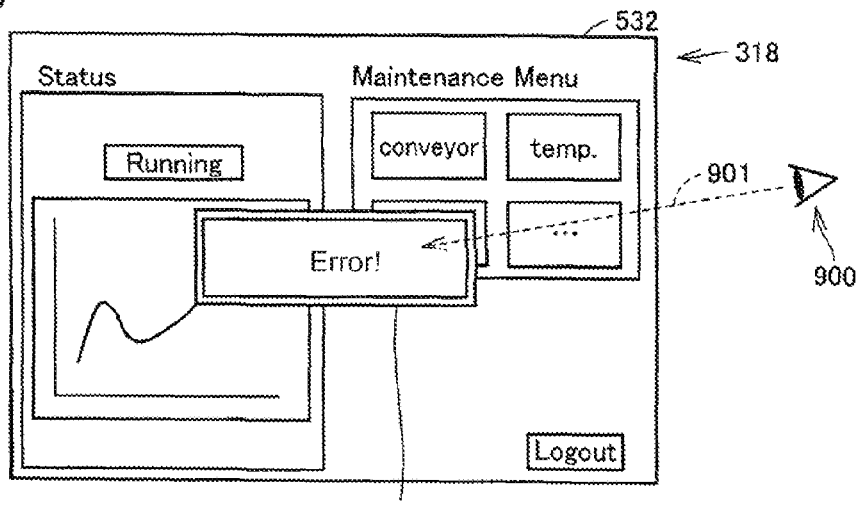
Figure 3C:
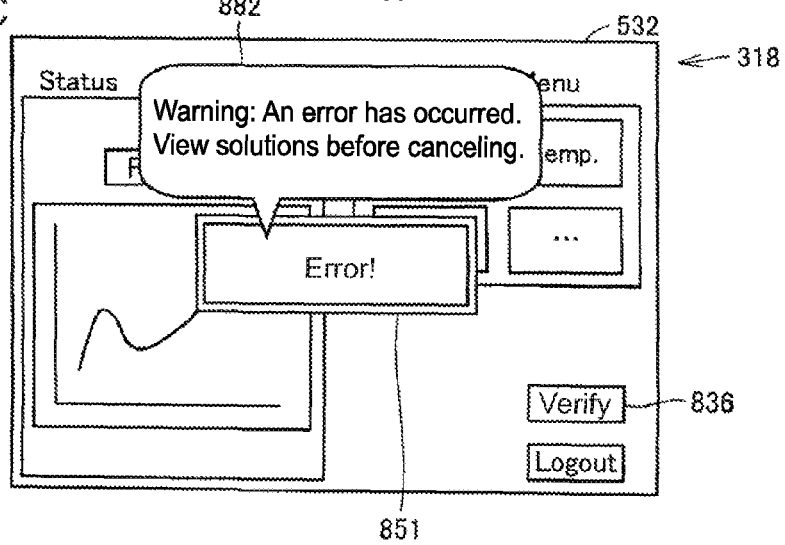

FIGS. 3A to 3C are diagrams each describing second processing performed in the programmable display device 300. More specifically, FIGS. 3A to 3C are diagrams each describing the processing performed when an error occurs in the control system 1 in the states shown in FIGS. 2A to 2C (or during displaying of the page screen 532).

Referring now to FIG. 3A, the programmable display device 300 displays an object 851 superimposed on the page screen 532. The object 851 shows an error as a warning prompt.

As shown in FIG. 3B, the user gazes at the object 851 for the reference time period T1. In other words, the user directs his or her sightline 901 to the object 851 for the reference time period T1. The programmable display device 300 implements the help function to display a support image 882 associated in advance with the object 851 in a manner superimposed on the page screen 532 as shown in FIG. 3C.

In the above example as well, the programmable display device 300 can provide an operational support to the user without waiting for an input operation directly performed with the user's finger.

b3. Big Data

In the first processing and in the second processing, the programmable display device 300 measures the time period for which the sightline 901 is continuously directed to one object (e.g., the object 8321 or 851) to determine whether the object 8321 is gazed at for the reference time period T1. Information about the measured time period is associated with identification information about the gazed object to allow an administrator of the control system 1 to effectively use such information.

The programmable display device 300 temporarily stores image identification information identifying an object in association with time information indicating the measured time period. The programmable display device 300 transmits the image identification information and the time information stored in association with each other to the server device 400. More specifically, the programmable display device 300 transmits the identification information and the time information stored in association with each other as log data (refer to FIG. 5) to the server device 400 via the PLC 100. The server device 400 receives the information transmitted from the programmable display device 300.

More specifically, the programmable display device 300 temporarily stores image identification information identifying an object (hereafter also referred to as an object ID), time information indicating the measured time period, and screen identification information identifying a page screen (hereafter also referred to as a page ID) in association with one another. The programmable display device 300 transmits the image identification information, the time information, and the screen identification information stored in association with one another to the server device 400.

The structure described above enables the administrator of the control system 1 (e.g., the user of the server device 400) to determine the time period for which the user of the programmable display device 300 has continuously gazed at the object using the server device 400. The structure also enables the administrator of the control system 1 to determine the time period for which the user of the programmable display device 300 has continuously gazed at the object using the programmable display device 300.

C. Hardware Configuration

Figure 4:
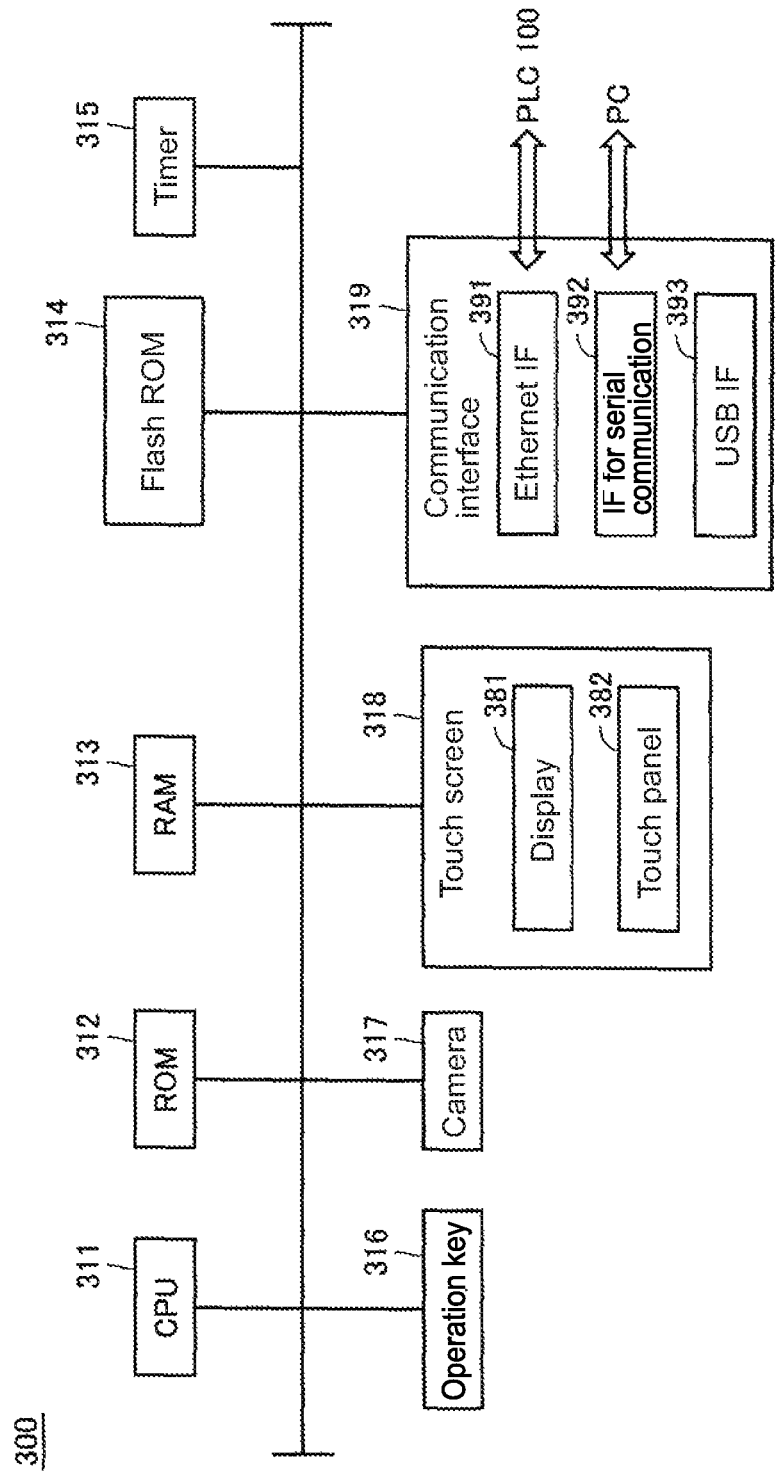
FIG. 4 is a diagram describing the hardware configuration of the programmable display device according to one embodiment.

FIG. 4 is a diagram describing the hardware configuration of the programmable display device 300 according to one embodiment. Referring now to FIG. 4, the programmable display device 300 includes a central processing unit (CPU) 311, which performs various computations, a read only memory (ROM) 312, a random access memory (RAM) 313, a flash ROM 314, which stores various programs in a nonvolatile manner, a timer 315, an operation key 316, a camera 317, the touch screen 318, and a communication interface 319. These components are connected to one another with an internal bus.

The touch screen 318 includes a display 381 and a touch panel 382 covering the display 381. The communication interface 319 includes an interface (IF) 391 for Ethernet (registered trademark), an IF 392 for serial communication, and an IF 393 for universal serial bus (USB) communication.

The CPU 311 reads a program stored in the flash ROM 314 and expands it in the RAM 313 or other places and executes the program. The ROM 312 typically stores programs including an operating system (OS). The RAM 313 is a volatile memory, and is used as a work memory.

The IF 391 for Ethernet supports an Ethernet communication protocol, and allows data communications with the PLC 100. The IF 392 for serial communication supports a serial communication protocol, and allows data communications with, for example, a personal computer (PC). The IF 393 for USB supports a USB communication protocol, and allows data communications with, for example, a USB flash drive.

The programmable display device 300 shown in FIG. 4 includes typical components. Thus, the gist of the present invention may be implemented by software stored in a memory such as the flash ROM 314, or software downloadable with a network. The operations of the hardware components of the programmable display device 300 are known in the art, and will not be described in detail.

D. Data

FIG. 5 is a table describing log data D5 to be transmitted from the programmable display device 300 to the server device 400. Referring to FIG. 5, the log data D5 includes a user ID for identifying a user, date and time information, information indicating operation details, a page ID for identifying a page screen, an object ID for identifying an object, information indicating the gaze time, and information indicating the pause time in association with one another. The log data D5 is transmitted to the server device 400 at a predetermined time for example.

The log data D5 will now be described below in correspondence with FIGS. 2A to 2C and 3A to 3C. In one example, the page ID for the page screen 532 (refer to FIGS. 2A to 2C) is P011. The object ID for the object 8321 (refer to FIGS. 2A to 2C) is G02. The object ID for the object 851 (refer to FIGS. 3A to 3C) is G03. The reference time period T1 is 10 sec.

In this case, the log data D5 includes information indicating that a user with the user ID A001 gazed at the object 8321 identified with G02 included in the page screen 532 identified with P011 for 30 sec. The log data D5 also includes information indicating that a user with the user ID A001 gazed at the object 851 identified with G03 included in the page screen 532 identified with P011 for 20 sec.

As described above, the log data D5 includes at least a page ID for identifying a page screen, an object ID for identifying an object, and time information in association with one another. The programmable display device 300 transmits the log data D5 to the server device 400. The server device 400 can thus obtain information associating the page ID, the object ID, and the time information with one another.

E. Functional Blocks

Figure 6:
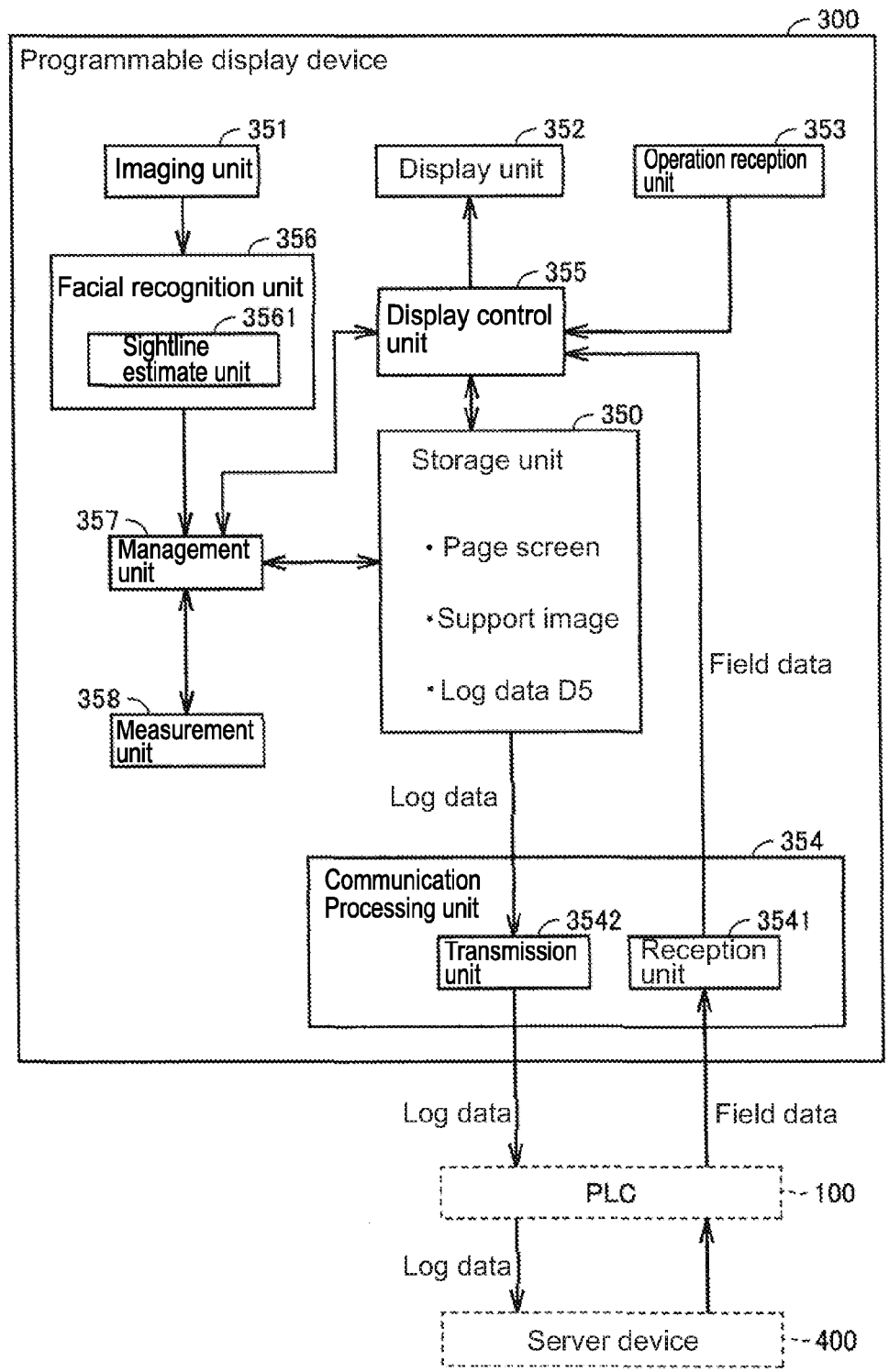
FIG. 6 is a diagram describing the functional blocks of the programmable display device.

FIG. 6 is a diagram describing the functional blocks of the programmable display device 300. As shown in FIG. 6, the programmable display device 300 includes a storage unit 350, an imaging unit 351, a display unit 352, an operation reception unit 353, a communication processing unit 354, a display control unit 355, a facial recognition unit 356, a management unit 357, and a measurement unit 358.

The communication processing unit 354 includes a reception unit 3541 and a transmission unit 3542. The facial recognition unit 356 includes a sightline estimate unit 3561. The imaging unit 351 corresponds to the camera 317 (FIG. 4). The display unit 352 corresponds to the display 381. The operation reception unit 353 corresponds to the touch panel 382. The measurement unit 358 corresponds to the timer 315.

The storage unit 350 prestores data for displaying a plurality of page screens and data for displaying a support image. The storage unit 350 further stores the log data D5.

For ease of explanation, the programmable display device 300 can display a page screen A (e.g., the page screen 532 shown in FIGS. 2A to 2C), a page screen B, and a page screen C, . . . . The page screen A includes an object A1, an object A2, and an object A3.

The display control unit 355 displays a designated page screen (e.g., the page screen A) selectively from the plurality of page screens A, B, and C on the display unit 352. The display control unit 355 may generate display image data to include field data obtained from the PLC 100 in a page screen depending on the type of the page screen. The reception unit 3541 receives the field data, which is then transmitted to the display control unit 355. When the operation reception unit 353 receives an instruction to switch the page screen, the display control unit 355 displays the page screen (e.g., the page screen B) in accordance with the instruction.

The imaging unit 351 captures an image of a subject, such as a person. The imaging unit 351 transmits image data obtained by capturing the image to the facial recognition unit 356.

The facial recognition unit 356 performs facial recognition. The sightline estimate unit 3561 included in the facial recognition unit 356 estimates the direction of the sightline based on image data transmitted from the imaging unit 351.

The management unit 357 receives an estimation result from the sightline estimate unit 3561. The management unit 357 receives information (page ID) for identifying a currently displayed page screen and positional information (more specifically, coordinate information) indicating the positions at which a plurality of objects are arranged from the display control unit 355. The management unit 357 determines whether the sightline is directed to an object based on the above estimation result, page ID, and positional information. When determining that the sightline is directed to an object, the management unit 357 further determines one of the objects to which the sightline is directed. When, for example, the display control unit 355 displays the page screen A on the display unit 352, the management unit 357 determines one of the plurality of objects A1 to A3 to which the sightline is directed.

When determining that the sightline is directed to an object by estimating the sightline, the management unit 357 causes the measurement unit 358 to measure the time period for which the sightline is directed to the object. The management unit 357 further updates the log data D5 stored in the storage unit 350 by associating the object ID for identifying the object, the information indicating the measured time period, and the page ID for identifying the page screen based on the above determination result. The programmable display device 300 performs this processing to obtain the log data D5 shown in FIG. 5.

The transmission unit 3542 included in the communication processing unit 354 transmits the log data D5 to the server device 400 via the PLC 100.

e. Displaying and Deleting Support Image

When the sightline has been directed to an object for at least the reference time period T1, the display control unit 355 displays a support image associated in advance with the object on the display unit 352. When, for example, the page screen A is displayed on the display unit 352, and the management unit 357 determines whether the sightline is directed to the object A1, the display control unit 355 displays a support image associated in advance with the object A1 in a manner superimposed on the page screen A on the display unit 352.

When displaying a support image on the display unit 352, the display control unit 355 further displays a verification button for deleting the displayed support image on the display unit 352 (refer to FIGS. 2C and 3C). The programmable display device 300 receives an input operation with the object 836 when satisfying the condition that the sightline is directed to the support image for at least a predetermined time T2 (hereafter also referred to as a reference time period T2). The reference time period T2 may have the same length as the reference time period T1.

As described above, the programmable display device 300 deletes the support image when satisfying the condition that the sightline is directed to the support image for a time period not less than the reference time period T2. The programmable display device 300 enables the user to verify the support image in a more reliable manner than the structure for deleting a support image without using the above condition.

The programmable display device 300 may receive an input operation with the object 836 without considering the reference time period T2, or specifically when satisfying the condition that the support image is displayed.

F. Control Mechanism

Figure 7:
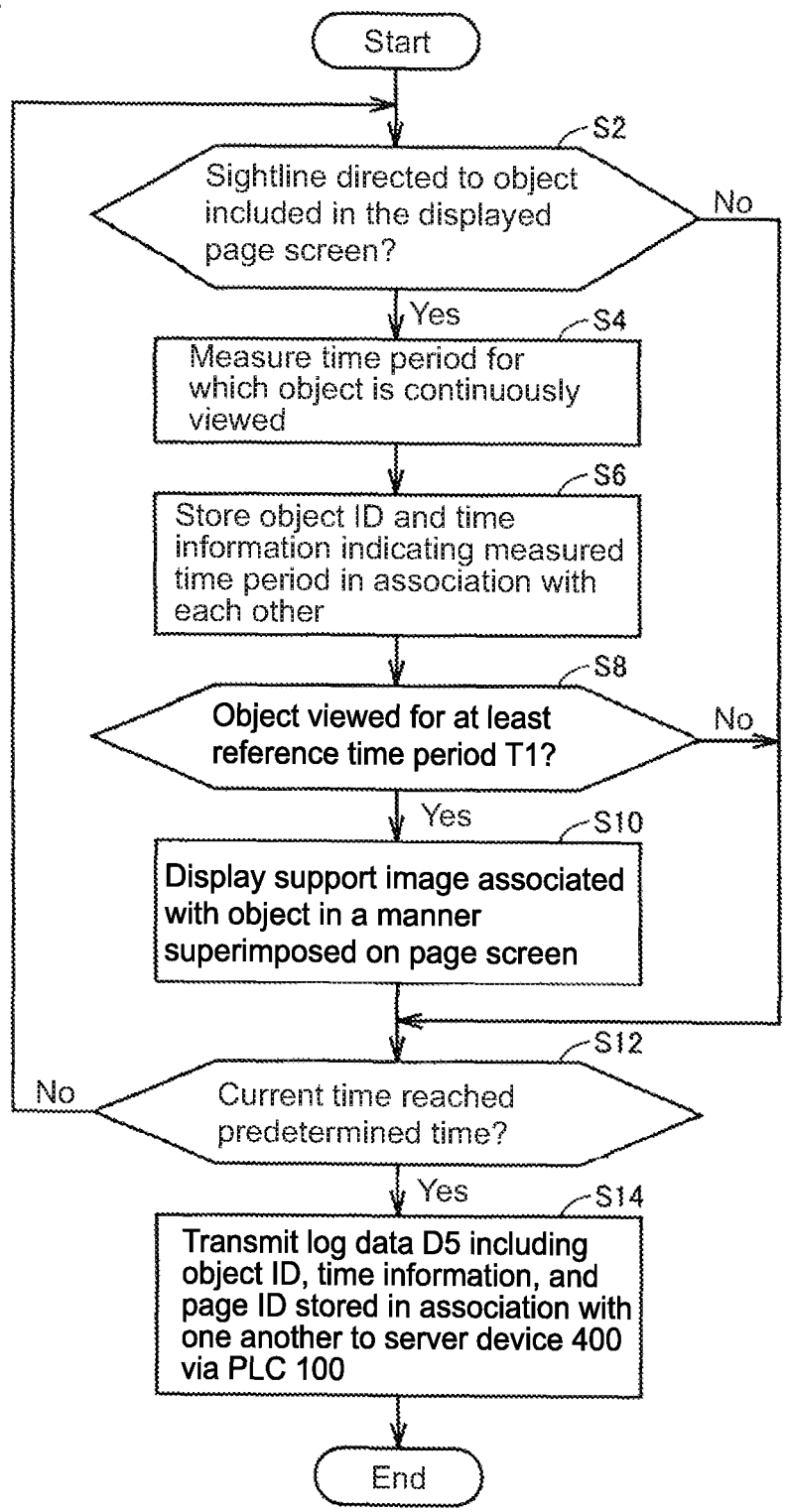
FIG. 7 is a flowchart showing a part of the processing performed by the programmable display device.

FIG. 7 is a flowchart showing a part of the processing performed by the programmable display device 300. Referring to FIG. 7, the CPU 311 included in the programmable display device 300 determines whether the sightline is directed to an object included in the displayed page screen in step S2.

When determining that the sightline is directed to the object (Yes in step S2), the CPU 311 measures the time period for which the object is continuously viewed using the timer 315 in step S4. When determining that the sightline is not directed to the object (No in step S2), the CPU 311 advances the processing to step S12.

In step S6, the CPU 311 stores an object ID for identifying the object that has been viewed continuously, time information indicating the measured time period, and a page ID for identifying the displayed page screen in association with one another. More specifically, the CPU 311 updates the log data D5 using the object ID, the time information, and the page ID.

In step S8, the CPU 311 determines whether the object has been viewed for at least the reference time period T1. When determining that the object has been viewed for at least the reference time period T1 (Yes in step S8), the CPU 311 displays a support image associated with the object in a manner superimposed on the page screen on the display 381 in step S10. When determining that the object has been viewed for a time period less than the reference time period T1 (No in step S8), the CPU 311 advances the processing to step S12.

The CPU 311 determines whether the current time has reached a predetermined time in step S12. The predetermined time may be, for example, the end time of the user operation (the end time of the workday).

When determining that the current time has yet to reach the predetermined time (No in step S12), the CPU 311 advances the processing to step S2. When determining that the current time has reached the predetermined time (Yes in step S12), the CPU 311 transmits the log data D5 including the object ID, the time information, and the page ID stored in association with one another to the server device 400 via the PLC 100 in step S14.

G. Modifications g1: First Modification

In the above embodiments, the programmable display device 300 displays the support image 882 when the sightline 901 of the user is directed to the object 851 for at least the predetermined time T1 as shown in FIGS. 3A to 3C. The example processing performed when the sightline of the user has not been directed to the object for at least the reference time period T1 will now be described.

Figure 8A:
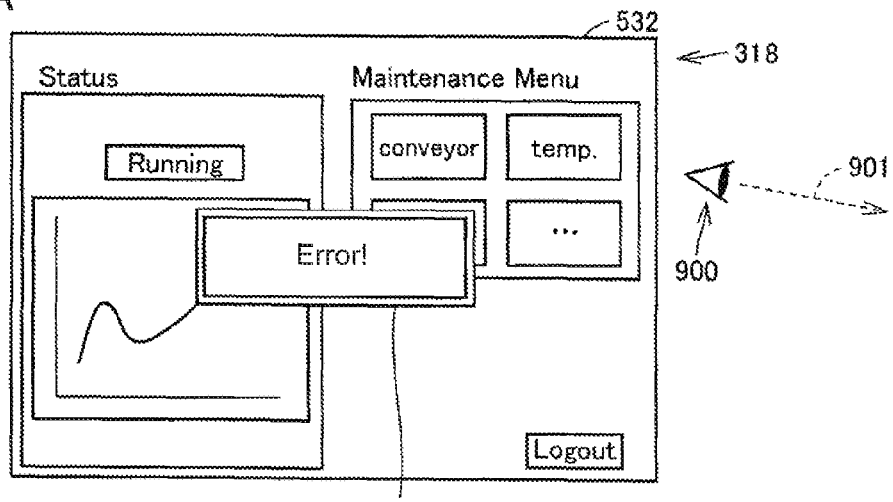
FIGS. 8A and 8B are diagrams each describing example processing performed when the sightline of a user has not been directed to an object for at least a reference time period T1.
Figure 8B:
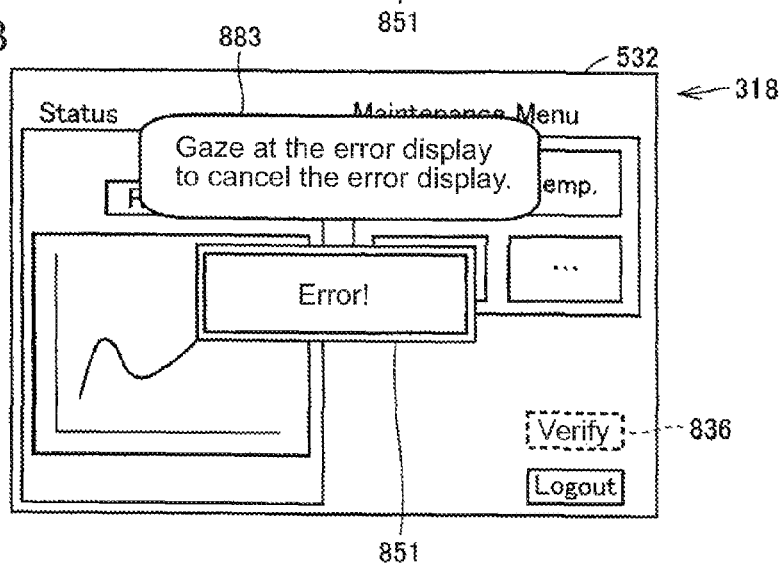

FIGS. 8A and 8B are diagrams each describing example processing performed when the sightline of the user has not been directed to an object for at least the reference time period T1. Referring to FIG. 8A, the programmable display device 300 displays the object 851 superimposed on the page screen 532. The user has not gazed at the object 851 for the reference time period T1. In other words, the sightline 901 of the user has not been directed to the object 851 for at least the reference time period T1.

In this case, as shown in FIG. 8B, the programmable display device 300 displays a support image 883 superimposed on the page screen 532 for prompting the user to view the object 851. The programmable display device 300 in the state shown in FIG. 8B switches the screen to the state shown in FIG. 3C when the user has gazed at the object 851 for at least the reference time period T1.

This structure enables the programmable display device 300 to guide the user to display a support image (e.g., the support image 882 shown in FIG. 3C) quickly. Further, the programmable display device 300 can prompt the user to direct his or her sightline to the display 381.

g2. Second Modification (1) Entire Screen Application

In the above modification, the programmable display device 300 records information about an object that has been gazed at as well as the time period for which the object has been gazed at. The programmable display device 300 may not be limited to this structure. The programmable display device 300 may record information about a page screen that has been gazed at as well as the time period for which the page screen has been gazed at. In other words, the programmable display device 300 may record the time period for which the user has viewed the screen in units of page screens instead of in units of objects.

Figure 9A:
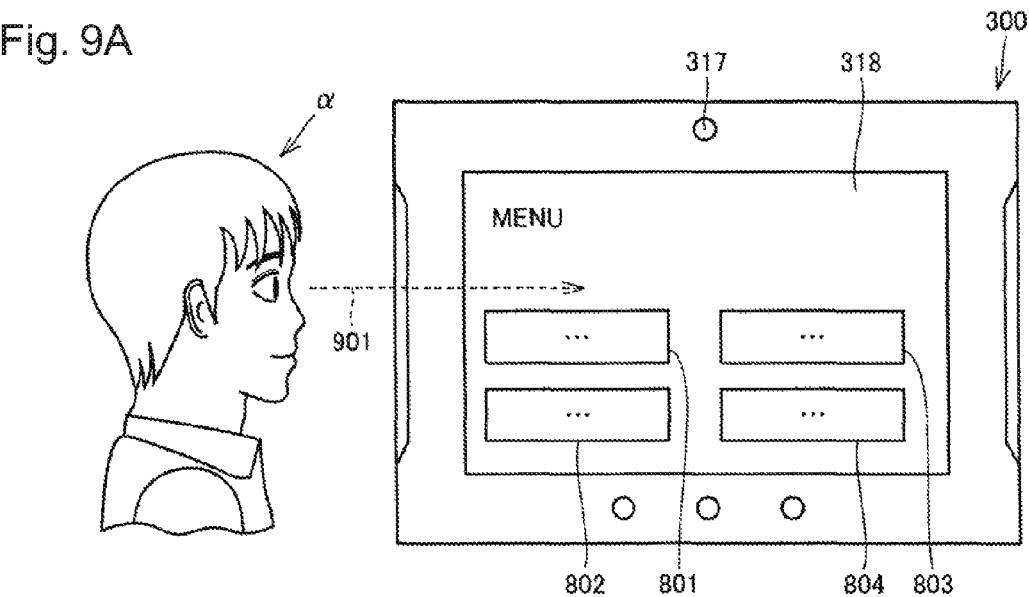
FIGS. 9A and 9B are diagrams describing the structure for recording a time period for which the user has viewed the screen in units of page screens.
Figure 9B:
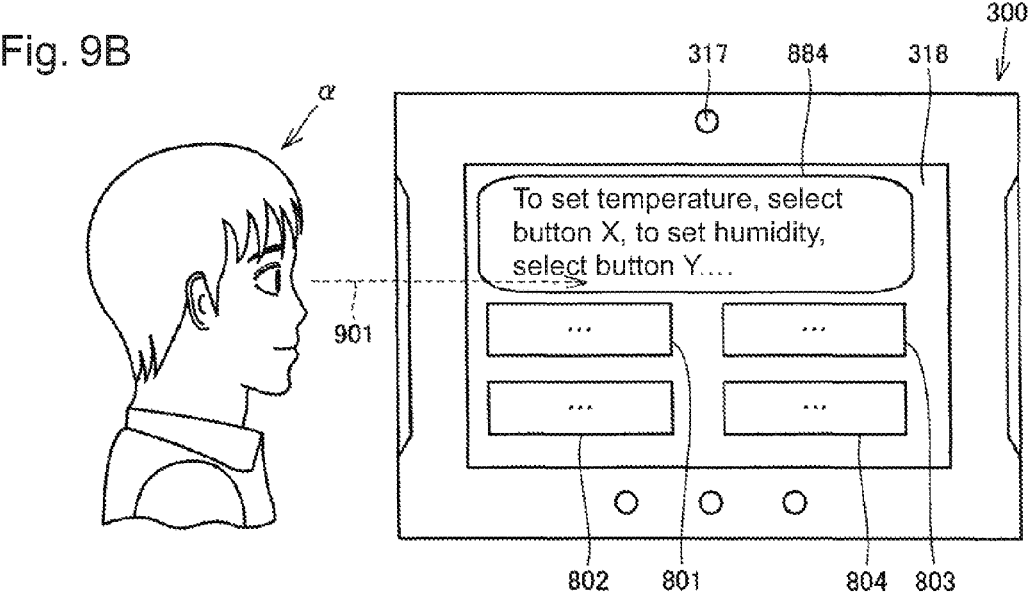

FIGS. 9A and 9B are diagrams describing the structure for recording a time period for which the user has viewed the screen in units of page screens. Referring to FIG. 9A, the programmable display device 300 displays a page screen including objects 801, 802, 803, and 804 on the touch screen 318.

In this state, a user α gazes at the page screen. When determining that the sightline of the user has been directed to the page screen based on the sightline estimation result, the programmable display device 300 measures the time period for which the sightline of the user has been directed to the page screen. The programmable display device 300 stores a page ID for identifying the page screen and time information indicating the measured time period in association with each other.

In the state shown in FIG. 9A, the user α further gazes at the page screen for at least the reference time period T1. In this case, referring now to FIG. 9B, the programmable display device 300 displays a support image 884 associated with the displayed page screen in a manner superimposed on the page screen on the touch screen 318.

The above structure allows the user to easily determine the operation to be performed by using the displayed page screen. In other words, the programmable display device 300 can provide an operational support to the user without waiting for an input operation directly performed with the user's finger.

The programmable display device 300 may record the viewing time in units of objects when displaying a predetermined first page screen. The programmable display device 300 may also record the viewing time in units of page screens when displaying a predetermined second page screen.

(2) Displaying Different Page Screens for Different User Segments

The programmable display device 300 can set levels of operation authority. The programmable display device 300 can set, for example, an administrator, a maintenance person, and an operator having higher levels of operation authority in this order.

Figure 10A:
FIGS. 10A and 10B are diagrams showing an example in which a user β with a lower level of operation authority than a user α is operating a programmable display device 300.
Figure 10A:
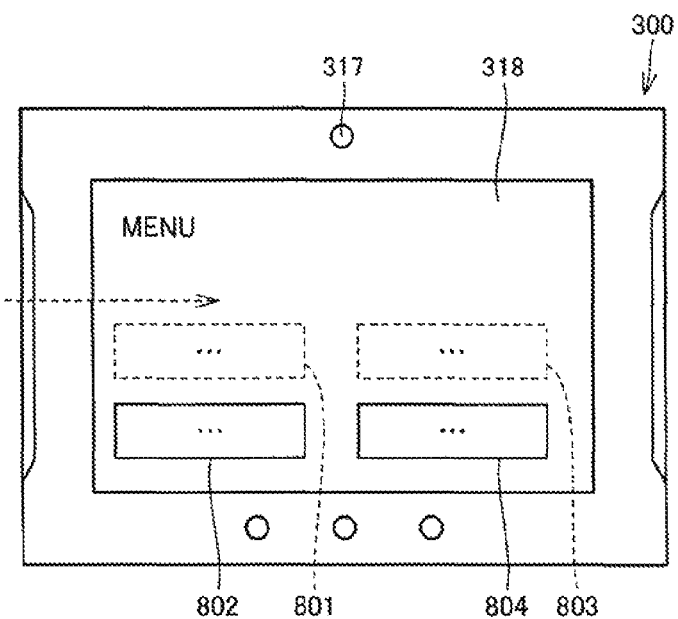
Figure 10B:
Figure 10B:
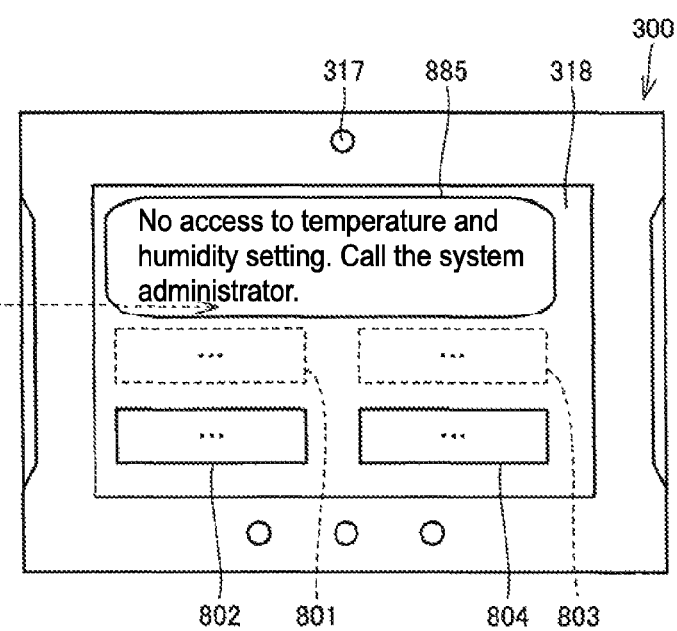

FIGS. 10A and 10B are diagrams showing an example in which a user β with a lower level of operation authority than a user α is operating the programmable display device 300. Referring to FIG. 10A, the programmable display device 300 displays a page screen including the objects 802 and 804 on the touch screen 318. Based on the operation authority set for the user β, the programmable display device 300 hides the objects 801 and 803 displayed when used by the user α.

In the state shown in FIG. 10A, the user β gazes at the page screen for at least the reference time period T1. Referring now to FIG. 10B, the programmable display device 300 displays a support image 885 associated with the displayed page screen in a manner superimposed on the page screen on the touch screen 318. Based on the operation authority set for the user, the programmable display device 300 displays the support image 885 different from the support image 884 displayed when used by the user α. The support image 885 in this example shows a message indicating that the operation is not permitted because the user has no operation authority.

The programmable display device 300 with this structure can display information for supporting the user currently operating the programmable display device 300 in accordance with the operation authority set for the user. The programmable display device 300 can thus improve the user's work efficiency.

g3. Third Modification

Figure 11:
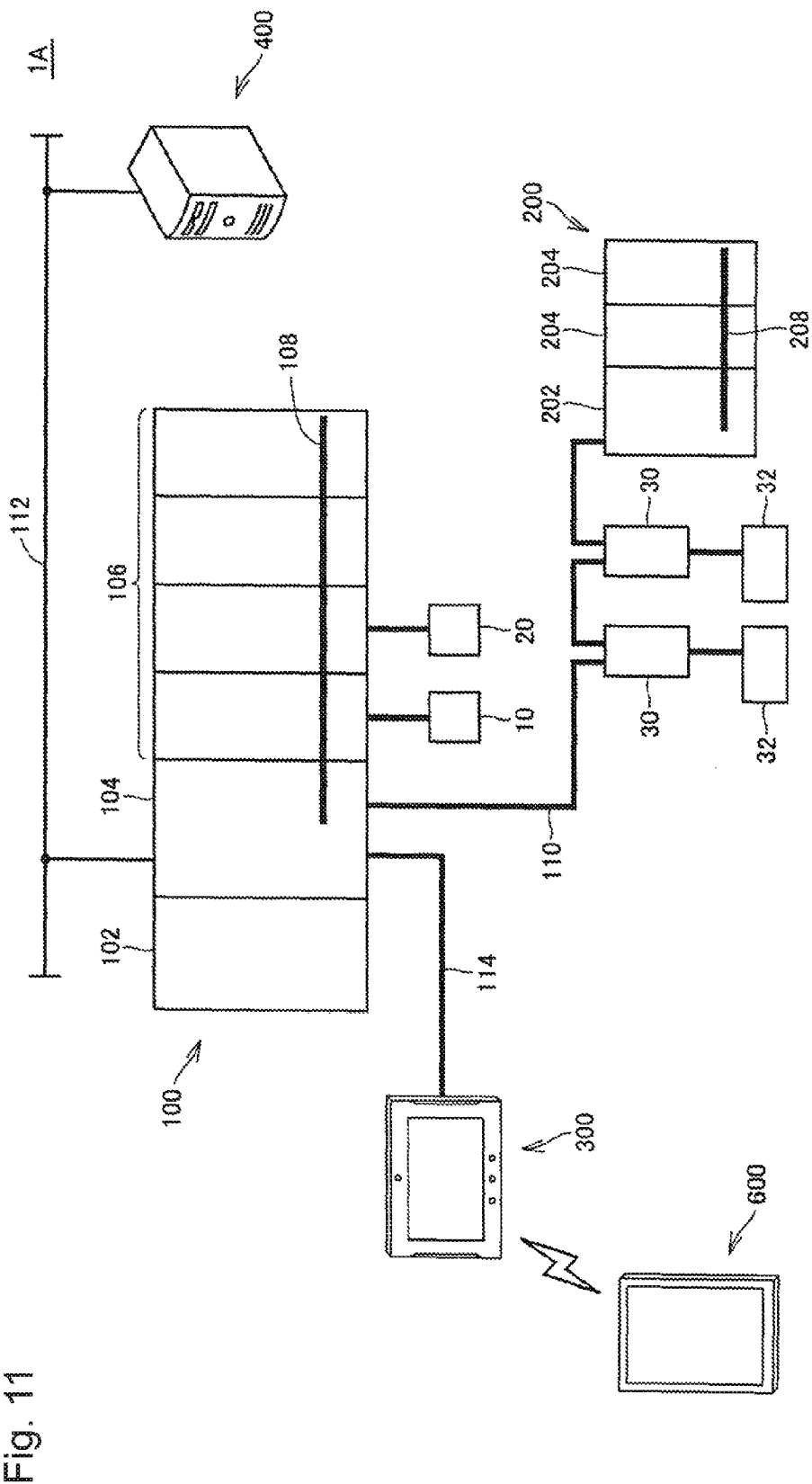
FIG. 11 is a diagram describing a control system according to a first modification.

FIG. 11 is a diagram describing a first modification of the control system 1. As shown in FIG. 11, a control system 1A includes a tablet terminal 600, in addition to the PLC 100, the programmable display device 300, and the server device 400. The control system 1A differs from the control system 1 in that it includes the tablet terminal 600.

The tablet terminal 600 communicates with the programmable display device 300. In the control system 1A, the tablet terminal 600 performs various processes described above (facial recognition, sightline estimation, updating the log data D5, and displaying a support image) either in place of or together with the programmable display device 300. This structure produces the same advantageous effects as the control system 1.

In the control system 1A, the tablet terminal 600 may directly communicate with the PLC 100 without using the programmable display device 300.

Figure 12:
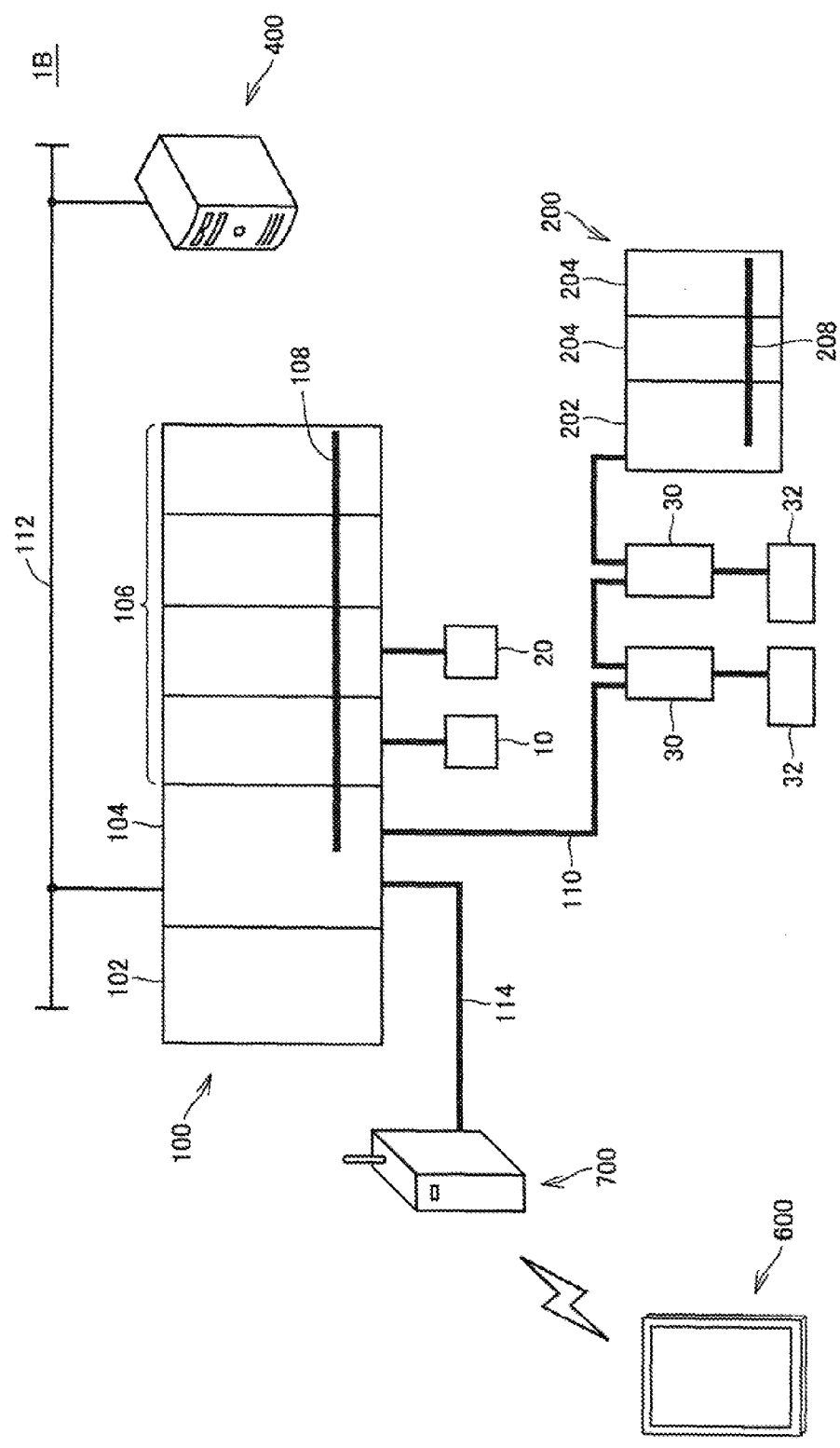
FIG. 12 is a diagram describing a control system according to a second modification.

FIG. 12 is a diagram describing a second modification of the control system 1. As shown in FIG. 12, a control system 1B includes the PLC 100, the server device 400, the tablet terminal 600, and a repeater 700. The control system 1B differs from the control system 1 in that it includes the repeater 700 in place of the programmable display device 300 and includes the tablet terminal 600.

The repeater 700 relays communications between the PLC 100 and the tablet terminal 600.

In the same manner as in the control system 1A, the tablet terminal 600 performs various processes described above (facial recognition, sightline estimation, updating the log data D5, and displaying a support image). This structure produces the same advantageous effects as the control system 1.

g4. Forth Modification

Figure 13:
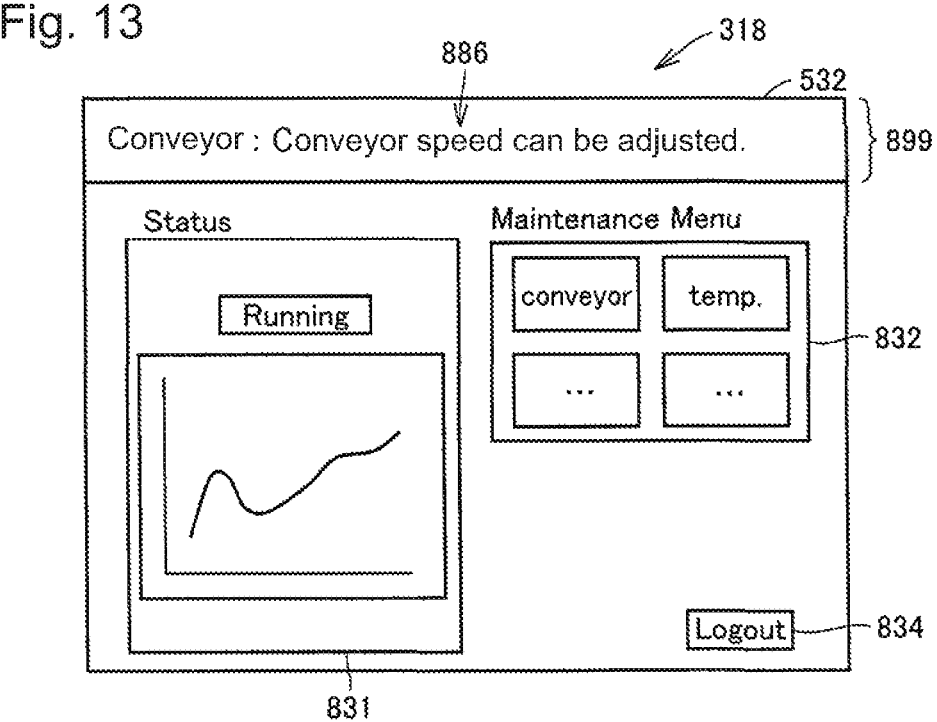
FIG. 13 is a diagram showing a screen appearing after switching from the state shown in FIG. 2B.

FIG. 13 is a diagram describing displaying of a support image according to a modification. More specifically, FIG. 13 corresponds to FIG. 2C. In other words, FIG. 13 is a diagram showing a screen appearing after switching from the state shown in FIG. 2B.

Referring now to FIG. 13, the programmable display device 300 sets a part of an area displaying the page screen as an area 899 for displaying a support image 886. In one example, the programmable display device 300 gradually expands the area for displaying the support image 886 from an edge of the screen, and displays the support image 886 in the expanded area (area 899 shown in FIG. 13).

In this displaying, the user can easily determine an operation to be performed by using the object. In other words, the programmable display device 300 can provide an operational support to the user without waiting for an input operation directly performed with the user's finger.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST

1, 1A, and 1B control system
100 PLC
102 power supply
104 CPU
106 and 204 IO unit
108 PLC system bus
200 terminal
202 communication coupler
208 terminal bus
300 programmable display device
311 CPU
315 timer
317 camera
318 touch screen
319 communication interface
350 storage unit
351 imaging unit
352 display unit
353 operation reception unit
354 communication processing unit
355 display control unit
356 facial recognition unit
357 management unit
358 measurement unit
381 display
382 touch panel
400 server device
532 page screen
600 tablet terminal
700 repeater
801, 802, 803, 804, 831, 832, 834, 836, 851, 8321, and 8322 object
881, 882, 883, 884, 885, and 886 support image
899 area
900 eye
901 sightline
3541 reception unit
3542 transmission unit
3561 sightline estimate unit
D5 log data

The invention claimed is:

1. A programmable display device, comprising:
an estimate unit configured to estimate a direction of a sightline using image data obtained by capturing an image of a person;
a display control unit configured to display a first screen including a first object on a display;
a measurement unit configured to measure a time period for which the sightline is directed to the first object when the sightline is determined to be directed to the first object through the estimation; and
a storage unit configured to store first image identification information identifying the first object and first time information indicating the measured time period in association with each other,
wherein the display control unit is configured to display an image associated in advance with the first object on the display when the time period for which the sightline is directed to the first object is not less than a first reference time period.

2. The programmable display device according to claim 1, further comprising:
a transmission unit configured to transmit the first image identification information and the first time information stored in association with each other to a server device.

3. The programmable display device according to claim 1, wherein
the image associated in advance is an image for supporting a user operation.

4. The programmable display device according to claim 3, wherein when displaying the image for supporting the user operation on the display, the display control unit is configured to further display, on a display, a software button for deleting the displayed image for supporting the user operation, and the programmable display device is configured to receive an input operation with the software button when satisfying a condition that the time period for which the sightline is directed to the image for supporting the user operation is not less than a second reference time period.

5. The programmable display device according to claim 1, wherein the first screen further includes a second object, and the measurement unit is configured to measure a time period for which the sightline is directed to the second object when the sightline is determined to be directed to the second object through the estimation, and the storage unit is configured to store second image identification information identifying the second object and second time information indicating the measured time period in association with each other.

6. The programmable display device according to claim 1, wherein when receiving an input instruction to switch from the first screen to a second screen, the display control unit is configured to display the second screen on the display, and the storage unit is configured to store first screen identification information identifying the first screen, the first image identification information, and the first time information in association with one another when the sightline is determined to be directed to the first object through the estimation during displaying of the first screen.

7. The programmable display device according to claim 1, wherein the first object is a software button.

8. A programmable display device, comprising:

an estimate unit configured to estimate a direction of a sightline using image data obtained by capturing an image of a person;

a display control unit configured to display a designated screen from a plurality of predetermined screens on a display;

a measurement unit configured to measure a time period for which the sightline is directed to the designated screen when the sightline is determined to be directed to the designated screen through the estimation; and a storage unit configured to store screen identification information identifying the designated screen and time information indicating the measured time period in association with each other, wherein the display control unit is configured to display an image associated in advance with the designated screen on the display when the time period for which the sightline is directed the designated screen is not less than a first reference time period.

9. A portable terminal device for obtaining, from a programmable logic controller via a repeater, data that the programmable logic controller has obtained from a control target device, the portable terminal device comprising:

an estimate unit configured to estimate a direction of a sightline using image data obtained by capturing an image of a person, wherein the image data is obtained from the programmable logic controller via the repeater;

a display control unit configured to display a screen including an object on a display;

a measurement unit configured to measure a time period for which the sightline is directed to the object when the sightline is determined to be directed to the object through the estimation; and a storage unit configured to store identification information identifying the object and time information indicating the measured time period in association with each other.

10. The portable terminal device according to claim 9, wherein the repeater is a programmable display device.

11. A portable terminal device wirelessly connectable to a programmable logic controller in a communicable manner, and configured to display data obtained from the programmable logic controller, the portable terminal device comprising:

an estimate unit configured to estimate a direction of a sightline using image data obtained by capturing an image of a person, wherein the image data is obtained from the programmable logic controller via a wireless link;

a display control unit configured to display a screen including an object on a display;

a measurement unit configured to measure a time period for which the sightline is directed to the object when the sightline is determined to be directed to the object through the estimation; and a storage unit configured to store identification information identifying the object and time information indicating the measured time period in association with each other.

12. A data processing method implementable by a programmable display device, the method comprising:

allowing a processor included in the programmable display device to estimate a direction of a sightline using image data obtained by capturing an image of a person;

allowing the processor to display a screen including an object on a display;

allowing the processor to measure a time period for which the sightline is directed to the object when the sightline is determined to be directed to the object through the estimation;

allowing the processor to store, in a memory, identification information identifying the object and time information indicating the measured time period in association with each other; and allowing the processor to display an image associated in advance with the object on the display when the time period for which the sightline is directed to the object is not less than a reference time period.

13. The method according to claim 12, further comprising allowing the processor to transmit the identification information and the time information in association with each other to a server device.

14. The method according to claim 12, wherein the image associated in advance is an image for supporting a user operation.

15. The method according to claim 14, further comprising:

allowing the processor, when displaying the image for supporting the user operation on the display, to display a software button for deleting the displayed image for supporting the user operation on the display; and allowing the processor, when a condition that the time period for which the sightline is directed to the image for supporting the user operation is not less than a second reference time period, to receive an input operation with the software button.

16. The method according to claim 12, further comprising:
allowing the processor to display a second object on the display;
allowing the processor to measure a second time period for which the sightline is directed to the second object when the sightline is determined to be directed to the second object through the estimation; and
allowing the processor to store, in the memory, second identification information identifying the second object and second time information indicating the measured time period in association with each other.

17. The method according to claim 12, further comprising:
allowing the processor to, in response to receiving an input instruction to switch from the screen to a second screen, display the second screen on the display; and
allowing the processor to store first screen identification information identifying the screen, the identification information, and the time information in association with one another when the sightline is determined to be directed to the object during displaying of the first screen.

18. The method according to claim 12, wherein the object is a software button.

19. A non-transitory computer-readable medium storing a program for controlling a programmable display device, the program causing a processor included in the programmable display device to perform operations comprising:
estimating a direction of a sightline using image data obtained by capturing an image of a person;
displaying a screen including an object on a display;
measuring a time period for which the sightline is directed to the object when the sightline is determined to be directed to the object through the estimation;
storing, in a memory, identification information identifying the object and time information indicating the measured time period in association with each other; and
displaying an image associated in advance with the object on the display when the time period for which the sightline is directed to the object is not less than a reference time period.

* * * * *